(12) United States Patent
Shearer et al.

(10) Patent No.: US 12,443,731 B2
(45) Date of Patent: Oct. 14, 2025

(54) SECURE DOCUMENT TRANSFER

(71) Applicant: Apple Inc., Cupertino, CA (US)

(72) Inventors: Nicholas J. Shearer, San Francisco, CA (US); Sunil Nair, Fremont, CA (US); Felix-Johannes A. Visée, London (GB); Eric K. Kimn, San Jose, CA (US); Salma Elshatanoufy, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 18/205,374

(22) Filed: Jun. 2, 2023

(65) Prior Publication Data
US 2024/0403456 A1 Dec. 5, 2024

(51) Int. Cl.
*G06F 21/62* (2013.01)
*G06F 21/35* (2013.01)
*G06F 21/60* (2013.01)

(52) U.S. Cl.
CPC .......... *G06F 21/6209* (2013.01); *G06F 21/35* (2013.01); *G06F 21/602* (2013.01)

(58) Field of Classification Search
CPC .... G06F 21/6209; G06F 21/35; G06F 21/602; G06Q 20/3278; G06Q 20/3829; H04L 63/107; H04L 9/0825; H04L 9/0897; H04L 63/0442; H04W 4/80
See application file for complete search history.

(56) References Cited

U.S. PATENT DOCUMENTS

| | | | |
|---|---|---|---|
| 7,260,224 B1 | 8/2007 | Ingle et al. | |
| 9,312,926 B2* | 4/2016 | Neafsey | ............ H04L 63/0428 |
| 9,749,134 B2 | 8/2017 | Perez et al. | |
| 2015/0278548 A1* | 10/2015 | Brands | ................... H04L 63/08 726/9 |
| 2020/0304317 A1 | 9/2020 | Richcreek et al. | |
| 2022/0191187 A1* | 6/2022 | Quintero | ............ H04L 63/0807 |

OTHER PUBLICATIONS

International Patent Application No. PCT/US2024/029873, International Search Report and Written Opinion, Mailed on Oct. 7, 2024, 13 pages.

\* cited by examiner

*Primary Examiner* — Izunna Okeke
(74) *Attorney, Agent, or Firm* — Kilpatrick Townsend & Stockton LLP

(57) ABSTRACT

After NFC transaction information is sent from the first device to the second device via the NFC protocol, the second device sends the NFC transaction information to the third-party. Both the first device and the third-party compute the same transaction identifier utilizing the NFC transaction information, and both the first device and the third-party register with a host server utilizing this transaction identifier. The first device may then send a public key to the host server with the transaction identifier, and the host server may send the public key to the third-party. The third-party may encrypt a document using the public key and may send the encrypted document to the host server with the transaction identifier. The host server may then send the encrypted document to the first device, where the first device may decrypt and present/store the decrypted document.

16 Claims, 7 Drawing Sheets

SECURE DOCUMENT TRANSFER

BACKGROUND

The near field communication (NFC) protocol is commonly used to transmit data in a contactless manner from a first device (such as a mobile device) to a second device (such as an NFC terminal). However, if the first device requests data that is only available from a third-party other than the second device, the NFC protocol has its drawbacks.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including receiving, at a host server from a user device, a public key, a user identifier, and a first request identifier, the first request identifier generated by the user device utilizing details of an interaction between a near-field communication (NFC) terminal and the user device; receiving, at the host server from a third-party server, a public key request that includes a second request identifier, the second request identifier generated by the third-party server utilizing the details of the interaction; comparing, by the host server, the first request identifier to the second request identifier; transmitting, by the host server, the public key to the third-party server in response to determining a match between the first request identifier and the second request identifier; receiving, at the host server from the third-party server, an encrypted document and the second request identifier, the encrypted document being encrypted utilizing the public key; and transmitting, by the host server, the encrypted document to the user device based at least in part on the user identifier. Other examples of this aspect include corresponding computer systems, apparatus, and computer programs recorded on one or more computer storage devices, each configured to perform the actions of the methods.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable storage media for performing a secure document transfer. The near field communication (NFC) protocol is commonly used to transmit data in a contactless manner from a first device (such as a mobile device) to a second device (such as an NFC terminal). However, if the first device requests data that is only available from a third-party other than the second device, the NFC protocol does not support the secure retrieval and transmission of such data while ensuring the anonymity of the first device and the third-party.

To address this issue, after NFC transaction information is sent from the first device to the second device via the NFC protocol, the second device sends the NFC transaction information to the third-party. Both the first device and the third-party compute the same transaction identifier utilizing the NFC transaction information, and both the first device and the third-party register with a host server utilizing this transaction identifier. The first device may then send a public key to the host server with the transaction identifier, and the host server may send the public key to the third-party. The third-party may encrypt a document using the public key and may send the encrypted document to the host server with the transaction identifier. The host server may then send the encrypted document to the first device, where the first device may decrypt and present/store the decrypted document.

The systems, devices, and techniques described herein provide several technical advantages that improve the security of performing document transfer using secure credentials and protecting user privacy. For example, the host server may enable the secure transfer of a document from the third-party to the first device while maintaining the anonymity of the first device and the third-party.

Figure 1:
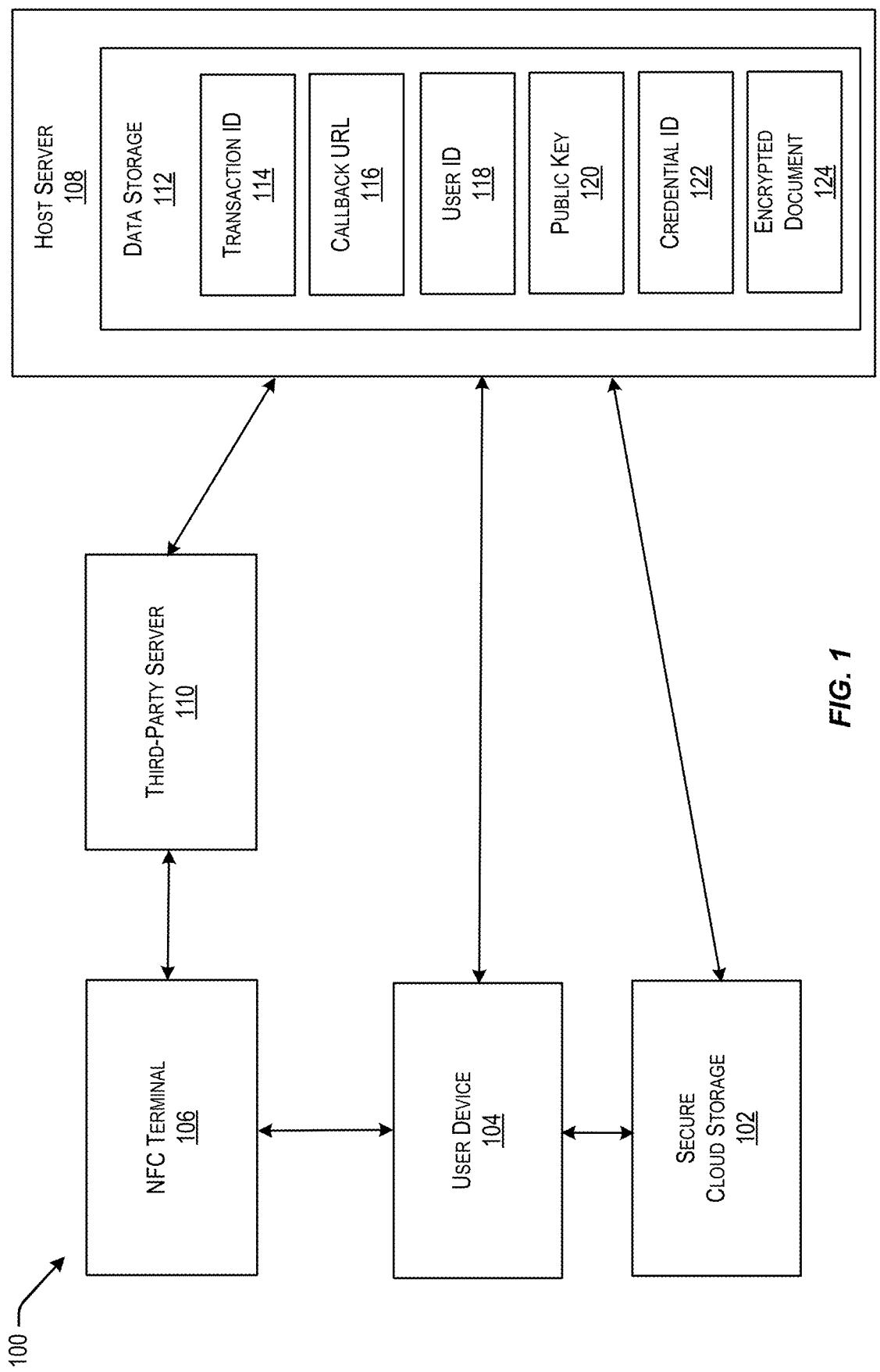
FIG. 1 illustrates a block diagram showing an example secure document transfer environment, according to at least one example.

Turning now to the figures, FIG. 1 illustrates a block diagram showing an example secure document transfer environment 100, according to at least one example. FIGS. 2-5 illustrate example flow diagrams showing processes according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

As shown in FIG. 1, a user device 104 is in communication with a near field communication (NFC) terminal 106. In one aspect, the user device 104 may include a mobile device, such as a cellular phone, a tablet computing device, a laptop computer, a watch-based computing device, etc. In another aspect, the NFC terminal 106 may include a computing device capable of sending and receiving data utilizing the NFC communication protocol. For example, the NFC terminal 106 may include a desktop computing device or server, or the NFC terminal 106 may also include a mobile device, such as a cellular phone, a tablet computing device, a laptop computer, etc. The user device 104 may also be capable of transmitting and/or receiving data via the NFC communication protocol.

Additionally, in one aspect, an NFC transaction may be performed between the user device 104 and the NFC terminal 106. The user device 104 and the NFC terminal 106 may be within a predetermined distance from each other when the NFC transaction is performed. Details of the NFC transaction, including data transmitted during the NFC transaction, are illustrated in step 202 of FIG. 2.

Further, the NFC terminal 106 is in communication with a third-party server 110. In one aspect, the third-party server 110 may include a computing device such as a server, a portion of a distributed computing device, etc. In another aspect, the third-party server 110 and the NFC terminal 106 may both be affiliated with a third-party separate from a user of the user device 104. In yet another aspect, NFC transaction information, including all or a portion of the information received from the user device 104 at the NFC terminal 106 during the transaction, may be sent to the third-party server 110 (e.g., for validation, further processing, etc.). An example of sending NFC transaction information from the NFC terminal 106 to the third-party server 110 is illustrated in operation 204 of FIG. 2.

Further still, in one aspect, the third-party server 110 is in communication with a host server 108. In one aspect, the host server 108 may include a computing device such as a server, a portion of a distributed computing device, etc. In another aspect, the third-party server 110 and the NFC terminal 106 may both be affiliated with a third-party separate from the host server 108. The host server 108 includes data storage 112, where the data storage 112 includes one or more of physical and/or virtual data storage. For example, the data storage 112 may include a portion of distributed hardware storage (such as one or more disk drives, solid state drives, random access media (RAM) storage, etc.), one or more allocations of virtual storage (such as one or more containerized storage allocations, etc.), etc.

Also, in one aspect, the third-party server 110 may send data to the host server 108 for storage in the data storage 112. For example, the third-party server 110 may calculate a transaction identifier (ID) 114 using NFC transaction information received from the NFC terminal 106 during the NFC transaction. The third-party server 110 may then send the transaction ID 114 and a callback URL 116 to the host server 108, where such information is validated and stored in the data storage 112 by the host server 108. Example details are illustrated in operations 206-208 of FIG. 2.

In addition, the host server 108 is in communication with the user device 104. For example, the user device 104 may generate a public key 120, a credential ID 122, and a user ID 118 (which, in some cases, may also correspond to a user device; however, in other examples, is not device-specific), and may send this information to the host server 108 for storage in the data storage 112. Example details are illustrated in operations 302-306 of FIG. 3. Additionally, the user device 104 may generate the transaction ID 114 (e.g., utilizing the NFC transaction information sent to the NFC terminal 106 during the NFC transaction) and may send the transaction ID to the host server 108 for storage in the data storage 112 in connection with the credential ID 122. Example details are illustrated in operations 308-312 of FIG. 3.

Furthermore, in one aspect, the transaction ID 114, the callback URL 116, the user ID 118, the public key 120, and the credential ID 122 may all be mapped/linked to each other within the data storage. For example, pointers may connect the aforementioned data elements to each other, an object may be created that stores all of the aforementioned data elements, etc. In another aspect, multiple different transaction IDs may be stored within the data storage 112, where each of the transaction IDs may be mapped to corresponding data specific to that transaction ID (e.g., a unique callback URL, a unique user ID, a unique public key, a unique credential ID, etc.).

Further still, in one aspect, when the host server 108 receives the public key 120 mapped to the transaction ID 114 from the user device 104, the host server 108 may then send the public key 120 to the third-party server 110. For example, the host server 108 may notify the third-party server 110 that the public key 120 has been obtained. This notification may be performed by contacting the third-party server 110 utilizing the callback URL 116. Example details are illustrated in operation 402 of FIG. 4.

Also, in response to this notification, the third-party server 110 may request the public key 120 from the host server 108, and the host server 108 may provide the public key 120 to the third-party server 110 in response to the request. Example details are illustrated in operation 404-406 of FIG. 4. The third-party server 110 may then encrypt a document (such as a document desired to be sent to the user device 104) using the public key 120 to create an encrypted document 124. The encrypted document 124 may then be sent from the third-party server 110 to the host server 108 (after which the host server 108 can transmit the encrypted document 124 to the secured cloud storage 102 as part of handling the third-party server request). Example details are illustrated in operations 410-412 of FIG. 4.

Additionally, after receiving the encrypted document 124 from the third-party server 110, the host server 108 may then either directly send the encrypted document 124 to the user device 104, or (as noted above) the host server 108 may send the encrypted document 124 to secure cloud storage 102, where the encrypted document 124 is sent from the secure cloud storage 102 to the user device 104 during a synchronization process. Example details are illustrated in operations 502-506 of FIG. 5.

Further, in response to receiving the encrypted document 124, the user device 104 may decrypt the encrypted document 124 (e.g., utilizing a private key corresponding to the public key 120). The user device 104 may then display the decrypted document (e.g., utilizing one or more interfaces, etc.), store the decrypted document (e.g., in local storage of the user device 104), etc. Example details are illustrated in operation 508 of FIG. 5.

In this way, the host server 108 may enable the secure transfer of the encrypted document 124 from the third-party server 110 to the user device 104, while maintaining the anonymity of the user device 104 and the third-party server 110. For example, the user device 104 may not be able to directly contact/communicate with the third-party server 110, and the third-party server 110 may not be able to directly contact/communicate with the user device 104. Also, the host server 108 may not be able to decrypt the encrypted document 124, as the host server only has the public key 120 but lacks the corresponding private key.

Further, the user device 104 may only receive the encrypted document 124 from the host server 108 by explicitly requesting the encrypted document 124 (or be explicitly sending the public key 120). The host server 108 may also regulate the sending of encrypted documents to the user device (e.g., according to a maximum document threshold for a predetermined period of time, etc.). This may eliminate the processing, by user device 104, of unwanted documents from the third-party server 110, which may improve overall performance of the user device 104.

Also, the user device 104 and the third-party server 110 may both independently calculate the same transaction ID 114, utilizing data transferred between the user device 104 and the NFC terminal 106 during the NFC transaction. After both the user device 104 and the third-party server 110 register the same transaction ID 114 with the host server 108, this transaction ID 114 may be used to anonymously transmit data from the user device 104 to the third-party server 110 (through the host server 108) and to anonymously transmit data from the third-party server 110 to the user device 104 (through the host server 108).

Figure 2:
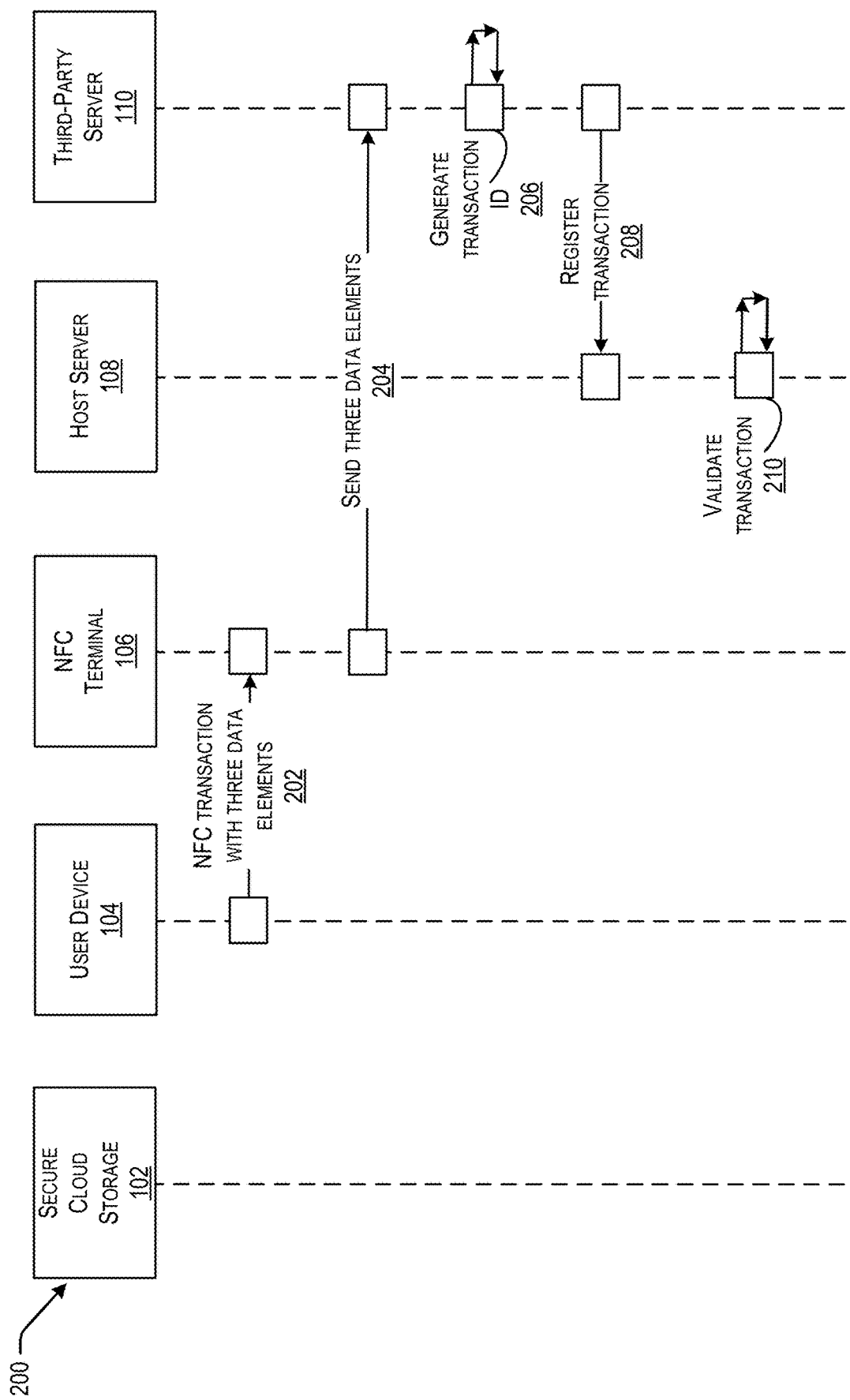
FIG. 2 illustrates a sequence diagram showing example processes for communicating transaction information between a third-party server and a host server, according to at least one example.

FIG. 2 illustrates a sequence diagram 200 showing example processes for communicating transaction information between a third-party server and a host server, according to at least one example. In step 202, an NFC transaction is made between a user device 104 and an NFC terminal 106, where data elements are sent from the user device 104 to the NFC terminal 106 during the NFC transaction. These data elements include at least an account identifier (e.g., the component identifier), a counter, and a cryptogram; however, other data elements can be included. In one aspect, the NFC transaction is made between an application running within the user device 104 and an application running within the NFC terminal 106. In another aspect, the NFC transaction may occur utilizing an NFC communication protocol. Also, in one aspect, the user device 104 and/or the NFC terminal 106 may be offline during the NFC transaction. While three specific data elements are described, and illustrated in FIG. 2, any number and/or type of data elements may be utilized to generate the transaction ID.

In one aspect, the transaction may include a request for information/data that is sent from the user device 104 to the NFC terminal 106. For example, the user device 104 may request data from the NFC terminal 106 and may provide the data elements to facilitate the request. In another aspect, the transaction may include a request for information/data that is sent from the NFC terminal 106 to the user device 104. For example, the NFC terminal 106 may request the data elements from the user device 104, and the user device 104 may provide the data elements to the NFC terminal 106 in response to the request.

Additionally, in one aspect, the account identifier may include an identifier of an account used by the user device 104 during the transaction with the NFC terminal 106. For example, the account identifier may include an alphanumeric string and/or a primary account number (PAN). In another aspect, the account identifier may include a driver's license identifier, a vehicle identification number (VIN), a credit card number (e.g., PAN), etc. In some examples, the account identifier and the component identifier (e.g., part of the "details of the interaction") can be the same.

Further, in one aspect, the counter may include an application transaction counter (ATC) that includes a unique integer value that is generated by an application of the user device 104 for the transaction between the user device 104 and the NFC terminal 106. For example, each transaction between the user device 104 and the NFC terminal 106 may have a unique counter value.

Further still, in one aspect, the cryptogram may include a coded textual value used by the user device 104 to authorize the transaction with the NFC terminal 106. In another aspect, the transaction may include an information request sent from the user device 104 to the NFC terminal 106. For example, the user device 104 may request a status and/or current location of an item, the delivery of one or more documents, etc. In yet another aspect, the transaction may include a payment authorization sent from a payment account of the user device 104 to the NFC terminal 106.

Also, in 204, the data elements are sent from the NFC terminal 106 to a third-party server 110. In one aspect, one or more communication networks (including one or more wireless networks, one or more wired networks, etc.) may be used to send the data elements from the NFC terminal 106 to the third-party server 110. In another aspect, the NFC terminal 106 and the third-party server 110 may be directly connected. In yet another aspect, the user device 104 may be associated with a first entity, and the NFC terminal 106 and the third-party server 110 may both be associated with a second entity separate from the first entity. In still another aspect, the third-party server 110 may process the transaction between the user device 104 and the NFC terminal 106.

In addition, in 206, the third-party server 110 generates a transaction identifier (ID) utilizing the data elements. In one aspect, the third-party server 110 may calculate a hash (such as a secure hash algorithm (SHA)-256 hash) utilizing the data elements. In another aspect, the user device 104 may generate the transaction ID and may send the transaction ID to the NFC terminal 106, which may forward the transaction ID on to the third-party server 110. One example of this transaction ID is the transaction ID 114 shown in FIG. 1. The third-party server 110 may also locally store the transaction ID at the third-party server 110 (e.g., in hardware and/or virtual storage, etc.).

Furthermore, in 208, the third-party server 110 registers the transaction with a host server 108. In one aspect, the host server 108 may be associated with the user device 104. For example, the host server 108 may facilitate the secure transfer of confidential data from the third-party server 110 to the user device 104. In another aspect, the third-party server 110 may register the transaction with the host server 108 by sending the transaction ID and a callback uniform resource locator (URL) to the third-party server 110 or the host server 108. For example, the callback URL may be used by the host server 108 to communicate information back to the third-party server 110. One example of this callback URL is the callback URL 116 shown in FIG. 1.

In one aspect, the registration of the transaction by the third-party server 110 with the host server 108 may have one or more temporal limitations. For example, the host server 108 may delete the transaction ID and/or the callback URL after a predetermined time period. In another aspect, the host server 108 may delete the transaction ID and/or the callback URL in response to a request from the user device 104. In yet another aspect, the host server 108 may delete the transaction ID and/or the callback URL in response determining that the user device 104 has not registered the transaction ID (e.g., see operation 310 of FIG. 3) within a predetermined period of time.

Further still, in 210, the host server 108 validates the transaction. For example, the host server 108 may confirm an authenticity of the third-party server 110 that sent the transaction registration. The host server 108 may also locally store the received information (e.g., the transaction ID and callback URL) within data storage of the host server 108 (such as the data storage 112 of FIG. 1).

Figure 3:
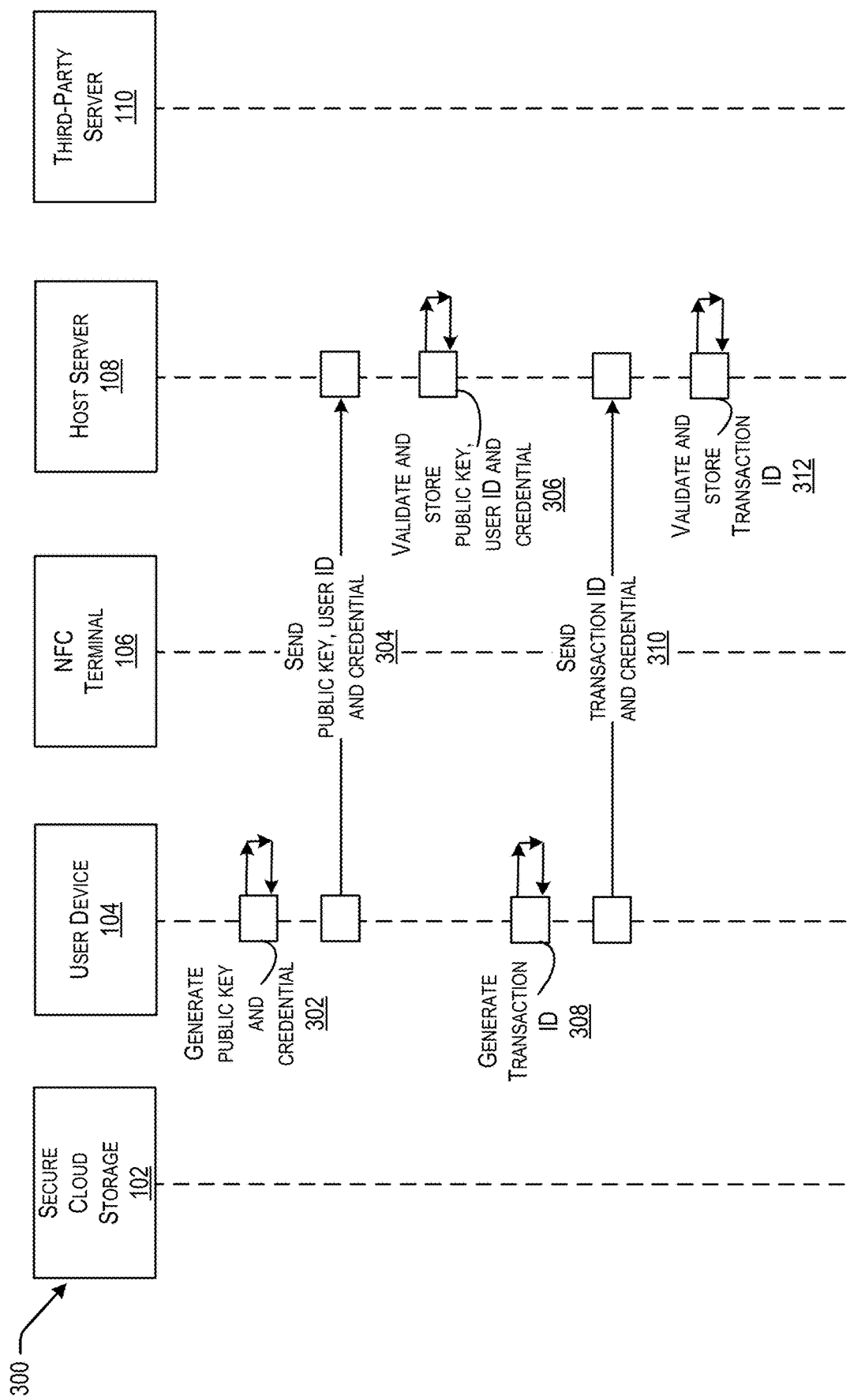
FIG. 3 illustrates a sequence diagram showing example processes for communicating transaction information between a user device and a host server, according to at least one example.

FIG. 3 illustrates a sequence diagram 300 showing example processes for communicating transaction information between a user device and a host server, according to at least one example. In 302, the user device 104 creates an asymmetric key pair (e.g., a public key and a corresponding private key), and assigns a credential identifier (ID) (e.g., a unique credential ID). In some examples, the asymmetric key pair is generated for a primary account number (PAN) and can be assigned to the primary account number. In one aspect, the public key and private key may be the two parts of a public key encryption key pair that is generated by the user device 104 utilizing one or more cryptographic algorithms. In another aspect, the public key may be used to encrypt a message (e.g., to create an encrypted message/ciphertext), while the corresponding private key may be used to decrypt the encrypted message/ciphertext. In another aspect, the user device 104 may store the public key, private key, and credential ID within one or more storage devices of the user device 104 (e.g., one or more hard drives, flash drives, etc.), and may map the public and private keys to the credential ID. One example of this public key is the public key 120 shown in FIG. 1.

Additionally, in one aspect, the credential identifier may include a secondary identifier of the account used by the user device 104 during the transaction with the NFC terminal 106 (see step 202 of FIG. 2). For example, the credential identifier may include a label assigned to the account, where the label is descriptive of the account or is randomly generated. One example of this credential identifier is the credential ID 122 shown in FIG. 1.

Further, in 304, the user device 104 sends the public key and the credential identifier, as well as a user identifier, to the host server 108. In one aspect, one or more communication networks (including one or more wireless networks, one or more wired networks, etc.) may be used to send the public key and the credential identifier from the user device 104 to the host server 108. In another aspect, the user identifier may include an identifier of a user of the user device 104, or an identifier of the user device 104 itself, etc. One example of this user identifier is the user ID 118 shown in FIG. 1.

Further still, in 306, the host server 108 validates the public key, the credential identifier, and the user ID and stores the public key, the credential identifier, and the user ID (e.g., in data storage such as the data storage 112 of FIG. 1, etc.). In one aspect, the public key and the user ID may be mapped to the credential identifier within the data storage of the host server 108. However, in other aspects, the host server does not store the credentials separately from transactions. Instead, the user device 104 can transmit all the information relevant for a specific transaction as part of its registration.

Also, in 308, the user device 104 generates a transaction identifier (ID) utilizing the data elements sent from the user device 104 to the NFC terminal 106 during the transaction shown in step 202 of FIG. 2. In one aspect, the user device 104 may calculate a hash (such as a secure hash algorithm (SHA)-256 hash) utilizing the data elements in a manner similar to the hash calculated by the third-party server 110 in operation 206 of FIG. 2. For example, the transaction ID generated by the user device 104 in operation 308 of FIG. 3 may be the same as the transaction ID generated by the third-party server 110 in operation 206 of FIG. 2. In another aspect, the user device 104 may store the transaction ID within one or more storage devices of the user device 104 (e.g., one or more hard drives, flash drives, etc.), and may map the transaction ID to the credential ID.

In addition, in 310, the transaction ID and the credential ID are sent from the user device 104 to the host server 108 as part of the registration. Additionally, the User ID, public key of the credential and metadata can be included with the transaction. In some examples, the metadata includes schema version numbers to support future operating system version, for example. In one aspect, one or more communication networks (including one or more wireless networks, one or more wired networks, etc.) may be used to send the transaction ID and the credential ID from the user device 104 to the host server 108. In one aspect, operations 304 and/or 310 may be performed at the same time as operation 208 of FIG. 2. In another aspect, operations 304 and/or 310 may be performed before or after operation 208 of FIG. 2.

Furthermore, in 312, the host server 108 can validate all the information received at 310 (e.g., User ID, the transaction ID, the credential ID, the public key of the credential, and the metadata) and store all this information (e.g., in data storage such as the data storage 112 of FIG. 1, etc.). In one aspect, the transaction ID may be mapped to the credential identifier within the data storage of the host server 108. In this way, the transaction ID and the public key may both be mapped to the credential identifier within the host server 108. Additionally, in some examples, the system may not actually use the transaction ID as-is, but may use a domain-specific identifier that is deterministically derived from the transaction ID.

Figure 4:
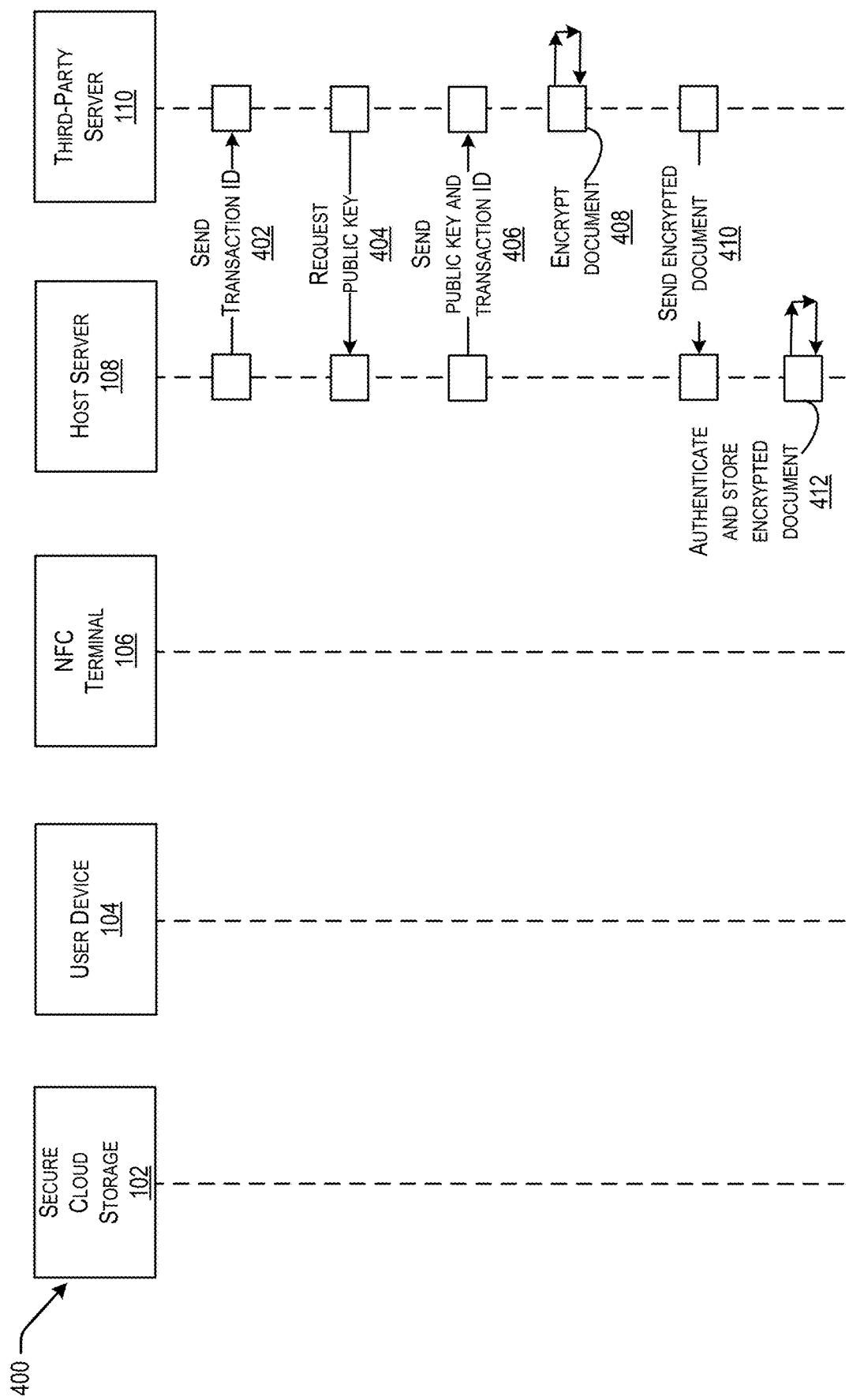
FIG. 4 illustrates a sequence diagram showing example processes for communicating encryption information between a third-party server and a host server, according to at least one example.

FIG. 4 illustrates a sequence diagram 400 showing example processes for communicating encryption information between a third-party server and a host server, according to at least one example. In 402, the transaction identifier is sent from the host server 108 to the third-party server 110. In one aspect, the host server 108 may call the callback URL provided by the third-party server 110 to the host server 108 (e.g., during the registration of the transaction as shown in operation 208 of FIG. 2). After calling the callback URL, the host server 108 may send the transaction identifier to the third-party server 110 via the callback URL. In another aspect, the host server 108 may send the transaction identifier to the third-party server 110 in response to receiving the public key and transaction identifier that are both mapped to the same credential identifier within the host server 108 (see for example, operations 310-312 of FIG. 3).

Additionally, in 404, a request for the public key mapped to the transaction identifier is sent by the third-party server 110 to the host server 108. In one aspect, the third-party server 110 may send the request in response to receipt of the transaction identifier from the host server 108 via the callback URL (see operation 402 of FIG. 4).

Further, in 406, the public key mapped to the transaction identifier, as well as the transaction identifier and the metadata received at 310, is sent from the host server 108 to the third-party server 110. Further still, in 408, the third-party server 110 encrypts a document utilizing the received public key. In one aspect, the document may include non-personal information such as details of a transaction (e.g., the transaction detailed in step 202 of FIG. 2, etc.), a location associated with the transaction, one or more updates associated with the transaction, etc. In another aspect, the third-party server 110 may generate an ephemeral key pair and use that with the received public key to derive a symmetric key to encrypt the document.

Further still, in 410, the third-party server 110 sends the encrypted document and the transaction identifier to the host server 108. Also, in 412, the host server 108 may immediately forward the document to the secure cloud storage associated with the user (such as the data storage 112 of FIG. 1). In one aspect, the encrypted document may be mapped to the transaction identifier (e.g., the transaction identifier for the transaction detailed in 202 of FIG. 2, etc.). One example of this encrypted document is the encrypted document 124 shown in FIG. 1. In another aspect, the third-party server 110 may generate multiple encrypted documents utilizing the received public key and may send each of the encrypted documents to the host server 108 with the transaction identifier.

Figure 5:
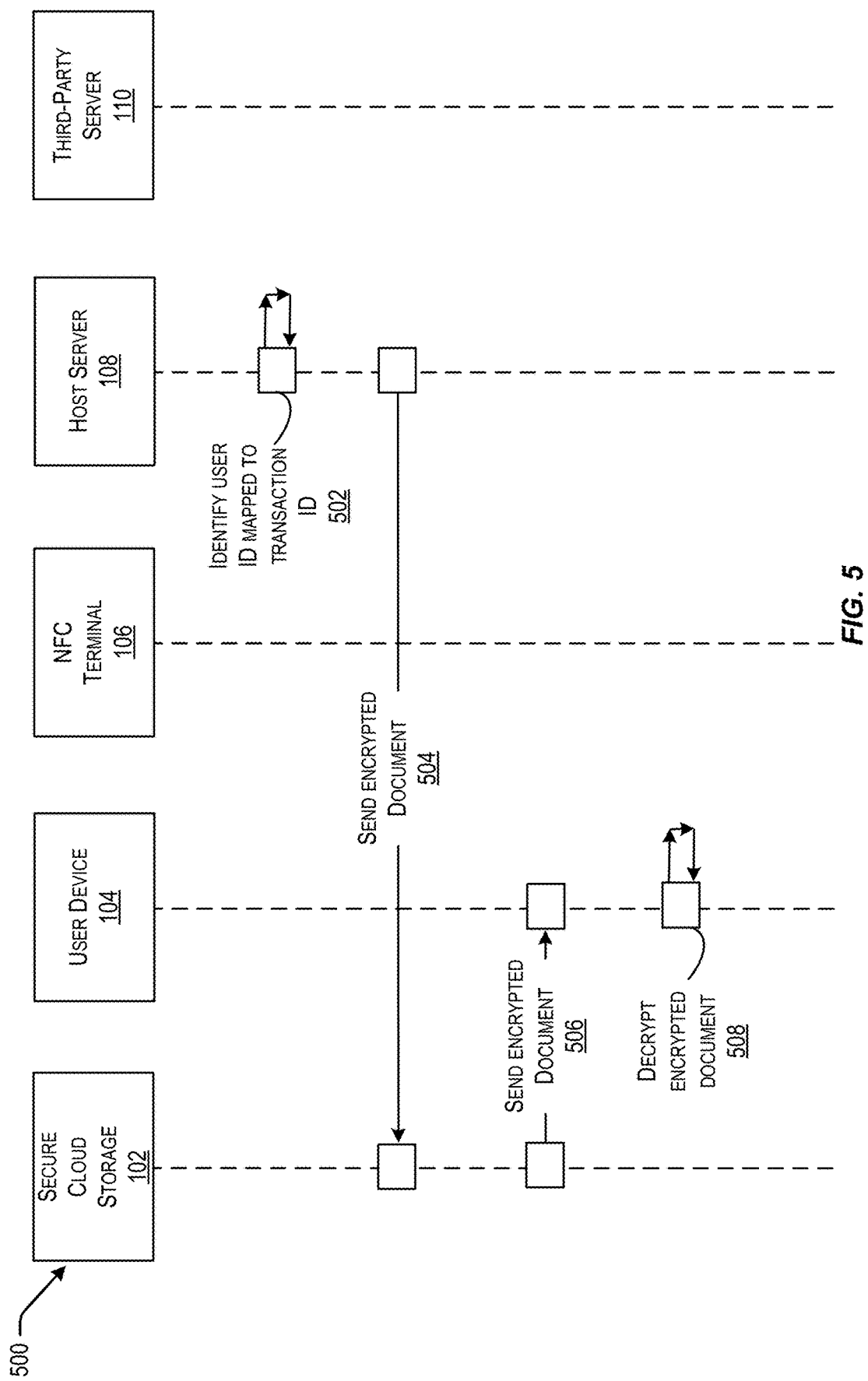
FIG. 5 illustrates a sequence diagram showing example processes for communicating encryption information between a host server and a user device, according to at least one example.

FIG. 5 illustrates a sequence diagram 500 showing example processes for communicating encryption information between a host server and a user device, according to at least one example. In 502, the host server 108 identifies the user ID and the encrypted document mapped to the transaction identifier and forwards the document to the secure cloud storage associated with the user (e.g., the data storage 112 of FIG. 1). Additionally, in 504, utilizing the identified user ID, the host server 108 sends the encrypted document to a portion of secure cloud storage 102 that is allocated for and accessible by the user device 104. In one aspect, the secure cloud storage 102 may include cloud-based data storage (such as one or more cloud-based databases) that performs one or more encryption/decryption routines on stored data to ensure a security of such data. In another aspect, the host server may send the transaction identifier with the encrypted document.

Additionally, in one aspect, the host server 108 may identify the portion of secure cloud storage 102 utilizing the user ID mapped to the transaction identifier. For example, the host server may send the user ID and transaction identifier to the secure cloud storage 102 with the encrypted document and an instruction to store the encrypted document mapped to the transaction identifier in a storage location within the secure cloud storage 102 that is allocated to the user ID. The secure cloud storage 102 may then identify the storage location allocated to the user ID and may store the encrypted document mapped to the transaction identifier within such location.

Further, in 506, the secure cloud storage 102 synchronizes with several different systems (e.g., to configure push notifications). In some examples, the secure cloud storage 102 sends the encrypted document to the user device 104. In one aspect, the secure cloud storage 102 may send the encrypted document and the transaction identifier to the user device 104 during one or more synchronization operations.

Further still, in 508, the user device 104 decrypts the encrypted document utilizing the private key. In one aspect, in response to receiving the encrypted document and transaction identifier from the secure cloud storage 102, the user device 104 may identify the private key mapped to the transaction identifier and may use the private key to decrypt the encrypted document. In another aspect, after decrypting the encrypted document, the user device 104 may store the decrypted document locally, may present the decrypted document to one or more users of the user device 104 (e.g., using one or more interfaces, displays, etc.), etc.

In this way, the host server 108 may act as a middleman between the user device 104 and the third-party server 110 and may facilitate the secure transmission of documents from the third-party server 110 and the user device 104. The third-party server 110 may not be able to communicate directly with the user device 104, thereby ensuring the anonymity of the user device 104. Likewise, the user device 104 may not be able to directly communicate with the third-party server 110. Documents sent by the third-party server 110 to the host server 108 may be encrypted and may therefore be unreadable by the host server 108. This may therefore improve a security of data transmissions between the third-party server 110 and the user device 104.

Figure 6:
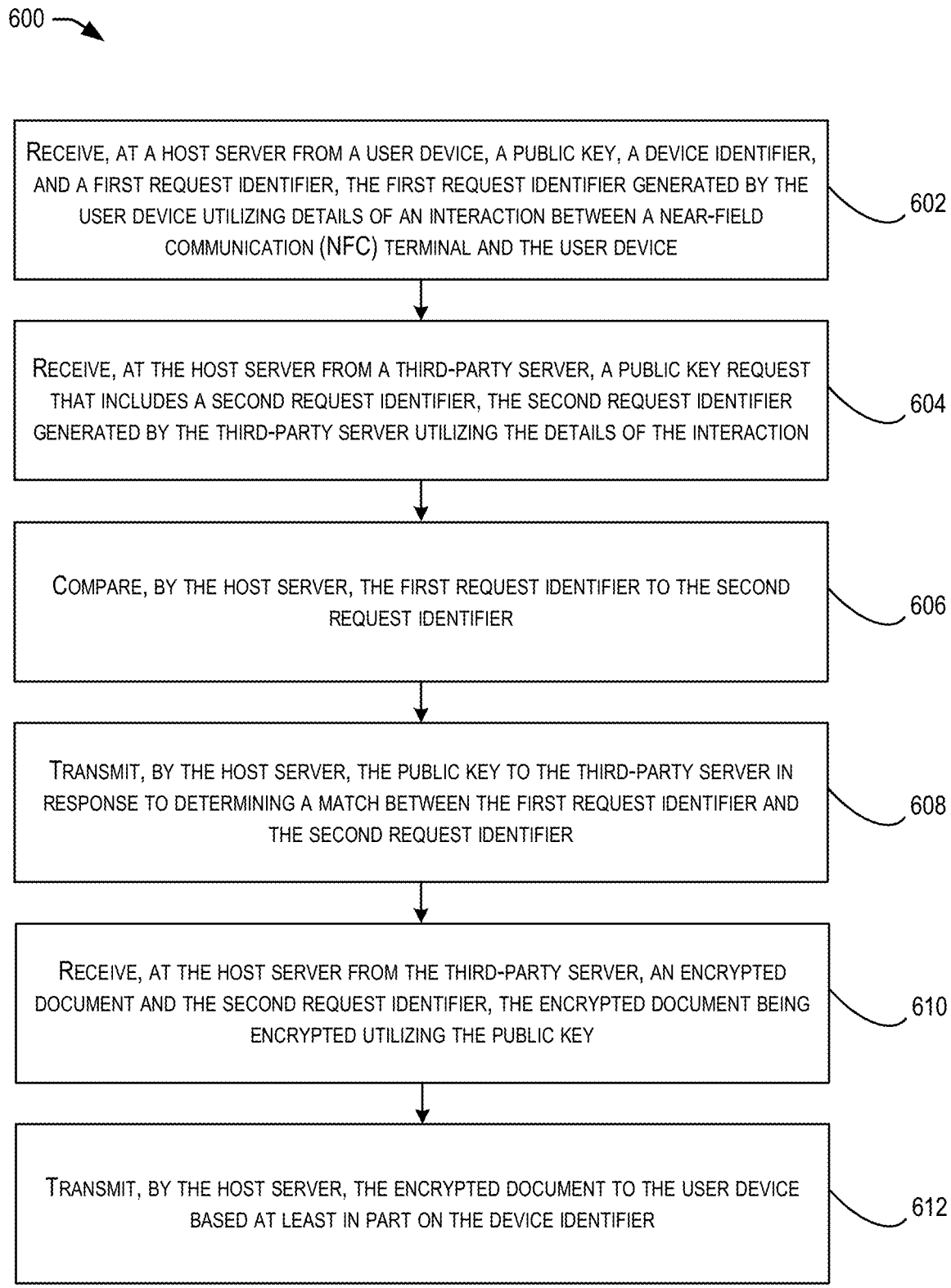
FIG. 6 illustrates a flowchart showing an example process for performing secure document transfer, according to at least one example.

FIG. 6 illustrates a flowchart showing an example process for performing secure document transfer, according to at least one example. In 602, a public key, a user identifier (or, in some examples, a device identifier), and a first request identifier are received at a host server from a user device, the first request identifier generated by the user device utilizing details of an interaction between a near-field communication (NFC) terminal and the user device. For example, the details of the interaction may include a component identifier, a counter, and a cryptogram used to authorize the interaction between the near-field communication (NFC) terminal and the user device.

Additionally, in 604, a public key request is received at the host server from a third-party server, where the public key request includes a second request identifier, the second request identifier generated by the third-party server utilizing the details of the interaction. In one aspect, the second request identifier and a callback uniform resource locator (URL) may be received at the host server from a third-party server. The host server may store the second request identifier mapped to the callback URL. In another aspect, the third-party server may be unable to directly communicate with the user device.

In one aspect, the host server may include the host server 108 of FIG. 1. The user device may include the user device 104 of FIG. 1. This third-party server may include the third party server 110 of FIG. 1.

Further, in 606, the host server compares the first request identifier to the second request identifier. In one aspect, the first request identifier and the second request identifier may both include an SHA-256 hash calculated utilizing the component identifier, the counter, and the cryptogram.

Further still, in 608, the host server 108 may merely notify the third-party server 110 about the availability of the public key and metadata (see, e.g., 402 of FIG. 4). The third-party server 110 may then request the data from the host server 108 (see, e.g., 404 of FIG. 4). Alternatively, the public key may be transmitted by the host server 108 to the third-party server 110 in response to determining a match between the first request identifier and the second request identifier. In one aspect, the host server 108 may transmit the public key to the third-party server 110 utilizing the callback URL received from the third-party server 110.

Also, in 610, an encrypted document and the second request identifier are received at the host server from the third-party server, where the encrypted document is encrypted utilizing the public key. In one aspect, the host server may not have access to the private key corresponding to the public key and may be unable to decrypt the encrypted document.

In one aspect, the encrypted document may include non-personal information. In another aspect, the encrypted document may include an update associated with a transaction between the user device and the third-party server. In yet another aspect, the encrypted document may include a confirmation of a transaction between the user device and the third-party server. In still another aspect, the encrypted document may include location information associated with a transaction between the user device and the third-party server.

In addition, in 612, the encrypted document is transmitted by the host server to the user device based at least in part on the user identifier. In one aspect, the encrypted document is transmitted by the host server to a portion of an encrypted cloud-based storage accessible by the user device utilizing the user identifier. In another aspect, the user device may receive the encrypted document from the host server, and may decrypt the encrypted document (e.g., using a private key corresponding to the public key sent from the user device to the host server) to obtain a decrypted document utilizing a private key corresponding to the public key. The user device may then present the decrypted document on a user interface of the user device.

In this way, the host server may enable the secure transfer of the encrypted document from the third-party server to the user device while maintaining the anonymity of the user device and the third-party server. For example, the user device may not be able to directly contact/communicate with the third-party server, and the third-party server may not be able to directly contact/communicate with the user device. Also, the host server may not be able to decrypt the encrypted document as the host server only has the public key but lacks the corresponding private key.

Figure 7:
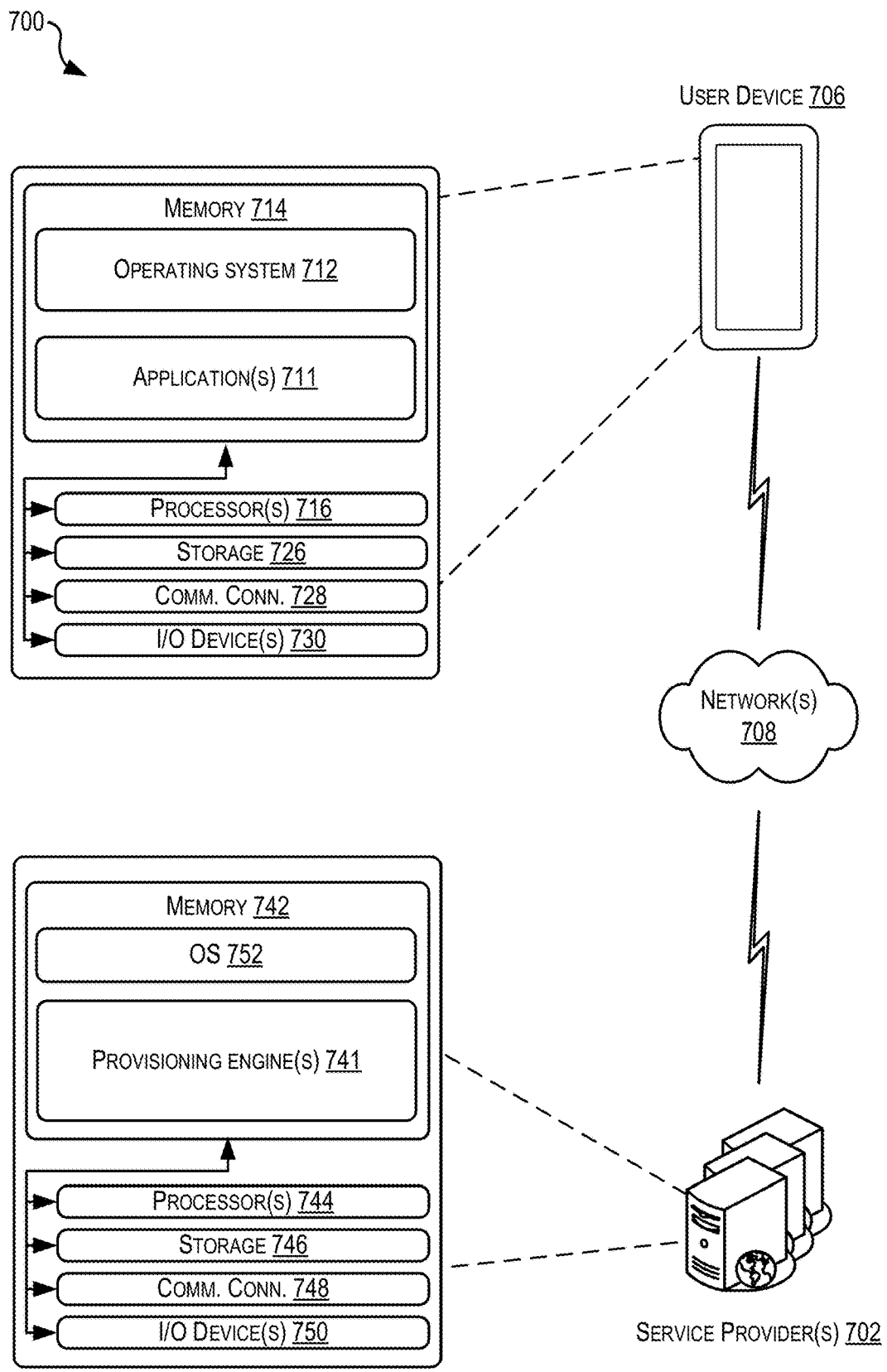
FIG. 7 illustrates a simplified block diagram depicting an example architecture for implementing the techniques described herein, according to at least one example.

FIG. 7 illustrates an example architecture or environment 700 configured to implement techniques described herein, according to at least one example. In some examples, the example architecture or environment 700 may further be configured to enable a user device 706 and service provider computer 702 to share information. The service provider computer 702 is an example of the host server 108. The user device 706 is an example of the user device 104. In some examples, the devices may be connected via one or more networks 708 (e.g., via Bluetooth, WiFi, the Internet, or the like). In some examples, the service provider computer 702 may be configured to implement at least some of the techniques described herein with reference to the user device 706.

In some examples, the networks 708 may include any one or a combination of many different types of networks, such as cable networks, the Internet, wireless networks, cellular networks, satellite networks, other private and/or public networks, or any combination thereof. While the illustrated example represents the user device 706 accessing the service provider computer 702 via the networks 708, the described techniques may equally apply in instances where the user device 706 interacts with the service provider computer 702 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer configurations, etc.).

As noted above, the user device 706 may be any type of computing device such as, but not limited to, a mobile phone, a smartphone, a personal digital assistant (PDA), a laptop computer, a desktop computer, a thin-client device, a tablet computer, a wearable device such as a smart watch, or the like. In some examples, the user device 706 may be in communication with the service provider computer 702 via the network 708, or via other network connections.

In one illustrative configuration, the user device 706 may include at least one memory 714 and one or more processing units (or processor(s)) 716. The processor(s) 716 may be implemented as appropriate in hardware, computer-executable instructions, firmware, or combinations thereof. Computer-executable instruction or firmware implementations of the processor(s) 716 may include computer-executable or machine-executable instructions written in any suitable programming language to perform the various functions described. The user device 706 may also include geo-location devices (e.g., a global positioning system (GPS) device or the like) for providing and/or recording geographic location information associated with the user device 706.

The memory 714 may store program instructions that are loadable and executable on the processor(s) 716, as well as data generated during the execution of these programs. Depending on the configuration and type of the user device 706, the memory 714 may be volatile (such as random access memory (RAM)) and/or non-volatile (such as read-only memory (ROM), flash memory, etc.). The user device 706 may also include additional removable storage and/or non-removable storage 726 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 714 and the additional storage 726, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 714 and the additional storage 726 are both examples of non-transitory computer storage media. Additional types of computer storage media that may be present in the user device 706 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 706. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 706 may also contain communications connection(s) 728 that allow the user device 706 to communicate with a data store, another computing device or server, user terminals, and/or other devices via the network 708. The user device 706 may also include I/O device(s) 730, such as a keyboard, a mouse, a pen, a voice input device, a touch screen input device, a display, speakers, a printer, etc.

Turning to the contents of the memory 714 in more detail, the memory 714 may include an operating system 712 and/or one or more application programs or services for implementing the features disclosed herein such as applications 711 (e.g., digital wallet, third-party applications, browser application, etc.). In some examples, the service provider computer 702 may also include a health application to perform similar techniques as described with reference to the user device 706. Similarly, at least some techniques described with reference to the service provider computer 702 may be performed by the user device 706.

The service provider computer 702 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, a virtual machine instance, etc. In some examples, the service provider computer 702 may be in communication with the user device 706 via the network 708, or via other network connections.

In one illustrative configuration, the service provider computer 702 may include at least one memory 742 and one or more processing units (or processor(s)) 744. The processor(s) 744 may be implemented as appropriate in hardware, computer-executable instructions, firmware, or combinations thereof. Computer-executable instruction or firmware implementations of the processor(s) 744 may include computer-executable or machine-executable instructions written in any suitable programming language to perform the various functions described.

The memory 742 may store program instructions that are loadable and executable on the processor(s) 744, as well as data generated during the execution of these programs. Depending on the configuration and type of service provider computer 702, the memory 742 may be volatile (such as RAM) and/or non-volatile (such as ROM, flash memory, etc.). The service provider computer 702 may also include additional removable storage and/or non-removable storage 746 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 742 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 742 and the additional storage 746, both removable and non-removable, are both additional examples of non-transitory computer-readable storage media.

The service provider computer 702 may also contain communications connection(s) 748 that allow the service provider computer 702 to communicate with a data store, another computing device or server, user terminals and/or other devices via the network 708. The service provider computer 702 may also include I/O device(s) 750, such as a keyboard, a mouse, a pen, a voice input device, a touch input device, a display, speakers, a printer, etc.

Turning to the contents of the memory 742 in more detail, the memory 742 may include an operating system 752 and/or one or more application programs or services for implementing the features disclosed herein including a provisioning engine(s) 741 (e.g., transport service 210, provisioning service 224, transaction processing service 226, and/or authentication service 230).

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data available from various sources to provide a comprehensive and complete window to a user's personal health record. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide enhancements to a user's personal health record. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method, comprising:
    receiving, at a host server from a user device, a public key, a user identifier, and a first request identifier, the first request identifier generated by the user device utilizing details of an interaction between a near-field communication (NFC) terminal and the user device;
    receiving, at the host server from a third-party server, a public key request that includes a second request identifier, the second request identifier generated by the third-party server utilizing the details of the interaction; comparing, by the host server, the first request identifier to the second request identifier; transmitting, by the host server, the public key to the third-party server in response to determining a match between the first request identifier and the second request identifier;
    receiving, at the host server from the third-party server, an encrypted document and the second request identifier, the encrypted document being encrypted utilizing the public key;
    and transmitting, by the host server, the encrypted document to the user device based at least in part on the user identifier, wherein the user device is configured to: receive the encrypted document from the host; decrypt the encrypted document to obtain a decrypted document utilizing a private key corresponding to the public key; and present the decrypted document on a user interface of the user device, wherein the host server does not have access to the private key corresponding to the public key, and wherein the host server is unable to decrypt the encrypted document.

2. The computer-implemented method of claim 1, further comprising:
    receiving, at the host server, the second request identifier and a callback uniform resource locator (URL) from a third party server;
    storing, at the host server, the second request identifier mapped to the callback URL; and
    transmitting, by the host server, the public key to the third-party server utilizing the callback URL.

3. The computer-implemented method of claim 1, wherein the third-party server is unable to directly communicate with the user device.

4. The computer-implemented method of claim 1, wherein the encrypted document includes non-personal information.

5. The computer-implemented method of claim 1, wherein the encrypted document includes an update associated with a transaction between the user device and the third-party server.

6. The computer-implemented method of claim 1, wherein the encrypted document includes a confirmation of a transaction between the user device and the third-party server.

7. The computer-implemented method of claim 1, wherein the encrypted document includes location information associated with a transaction between the user device and the third-party server.

8. The computer-implemented method of claim 1, wherein the details of the interaction include a component identifier, a counter, and a cryptogram used to authorize the interaction between the near-field communication (NFC) terminal and the user device.

9. The computer-implemented method of claim 8, wherein the first request identifier and the second request identifier both include an SHA-256 hash calculated utilizing the component identifier, the counter, and the cryptogram.

10. The computer-implemented method of claim 1, wherein the encrypted document is transmitted by the host server to a portion of an encrypted cloud-based storage accessible by the user device utilizing the user identifier.

11. One or more computer-readable media comprising computer-executable instructions that, when executed by one or more processors, cause the one or more processors to perform operations comprising:
receiving, at a host server from a user device, a public key, a user identifier, and a first request identifier, the first request identifier generated by the user device utilizing details of an interaction between a near-field communication (NFC) terminal and the user device; receiving, at the host server from a third-party server, a public key request that includes a second request identifier, the second request identifier generated by the third-party server utilizing the details of the interaction; comparing, by the host server, the first request identifier to the second request identifier; transmitting, by the host server, the public key to the third-party server in response to determining a match between the first request identifier and the second request identifier;
receiving, at the host server from the third-party server, an encrypted document and the second request identifier, the encrypted document being encrypted utilizing the public key; and
transmitting, by the host server, the encrypted document to the user device based at least in part on the user identifier, wherein the user device is configured to: receive the encrypted document from the host; decrypt the encrypted document to obtain a decrypted document utilizing a private key corresponding to the public key; and present the decrypted document on a user interface of the user device, wherein the host server does not have access to the private key corresponding to the public key, and wherein the host server is unable to decrypt the encrypted document.

12. The one or more computer-readable media of claim 11, wherein the computer-executable instructions further cause the one or more processors to perform operations comprising:
receiving, at the host server, the second request identifier and a callback uniform resource locator (URL) from a third party server;
storing, at the host server, the second request identifier mapped to the callback URL; and
transmitting, by the host server, the public key to the third-party server utilizing the callback URL.

13. The one or more computer-readable media of claim 11, wherein the third-party server is unable to directly communicate with the user device.

14. The one or more computer-readable media of claim 11, wherein the encrypted document includes non-personal information.

15. The one or more computer-readable media of claim 11, wherein the encrypted document includes an update associated with a transaction between the user device and the third-party server.

16. A system, comprising:
a memory comprising computer-executable instructions; and
a processor configured to access the memory and execute the computer-executable instructions to at least: receive, at a host server from a user device, a public key, a user identifier, and a first request identifier, the first request identifier generated by the user device utilizing details of an interaction between a near-field communication (NFC) terminal and the user device; receive, at the host server from a third-party server, a public key request that includes a second request identifier, the second request identifier generated by the third-party server utilizing the details of the interaction; compare, by the host server, the first request identifier to the second request identifier; transmit, by the host server, the public key to the third-party server in response to determining a match between the first request identifier and the second request identifier;
receive, at the host server from the third-party server, an encrypted document and the second request identifier, the encrypted document being encrypted utilizing the public key; and transmit, by the host server, the encrypted document to the user device based at least in part on the user identifier, wherein the user device is configured to: receive the encrypted document from the host; decrypt the encrypted document to obtain a decrypted document utilizing a private key corresponding to the public key; and present the decrypted document on a user interface of the user device, wherein the host server does not have access to the private key corresponding to the public key, and wherein the host server is unable to decrypt the encrypted document.

* * * * *